(12) United States Patent
Lu et al.

(10) Patent No.: US 9,753,321 B2
(45) Date of Patent: Sep. 5, 2017

(54) COLOR FILTER SUBSTRATE AND MANUFACTURING METHOD THEREOF

(71) Applicant: BOE Technology Group Co., Ltd., Beijing (CN)

(72) Inventors: Jinbo Lu, Beijing (CN); Jianshe Xue, Beijing (CN); Jisheng Zhao, Beijing (CN); Lin Li, Beijing (CN); Chen Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 237 days.

(21) Appl. No.: 13/994,738

(22) PCT Filed: Nov. 23, 2012

(86) PCT No.: PCT/CN2012/085202
§ 371 (c)(1),
(2) Date: Jun. 16, 2013

(87) PCT Pub. No.: WO2013/123788
PCT Pub. Date: Aug. 29, 2013

(65) Prior Publication Data
US 2014/0063631 A1 Mar. 6, 2014

(30) Foreign Application Priority Data
Feb. 24, 2012 (CN) .......................... 2012 1 0044709

(51) Int. Cl.
*G02F 1/1335* (2006.01)
*G02F 1/1333* (2006.01)

(52) U.S. Cl.
CPC .. *G02F 1/133514* (2013.01); *G02F 1/133516* (2013.01); *G02F 1/133382* (2013.01); *G02F 1/133512* (2013.01)

(58) Field of Classification Search
CPC . G02B 5/20; G02B 5/22; G02B 5/223; G02B 5/226; G02B 5/23
(Continued)

(56) References Cited

U.S. PATENT DOCUMENTS 6,414,733 B1 * 7/2002 Ishikawa et al. ............. 349/110
6,849,109 B2 * 2/2005 Yadav et al. ................ 106/31.13
(Continued)

FOREIGN PATENT DOCUMENTS

| CN | 1491984 A | 4/2004 |
|---|---|---|
| CN | 1611994 A | 5/2005 |

(Continued)

OTHER PUBLICATIONS

English translation of Chinese patent No. CN 1611994 (A), listed above in Foreign Patent Documents, 19 pages.
(Continued)

*Primary Examiner* — Scott J Sugarman
*Assistant Examiner* — Robert E Tallman

(57) ABSTRACT

Disclosed are a color filter substrate and the manufacturing method thereof. The color filter substrate comprises: a substrate (1); a black matrix (3) and a color pixel layer (4, 5, 6) formed on the substrate (1); and a transparent thermally conductive layer (2) disposed between the substrate (1) and the black matrix (3) and between the substrate (1) and the color pixel layer (4, 5, 6).

2 Claims, 2 Drawing Sheets

(58) Field of Classification Search
USPC ......... 359/722–723, 885, 890, 891, 227–236
See application file for complete search history.

(56) References Cited

U.S. PATENT DOCUMENTS

| | | | |
|---|---|---|---|
| 2002/0047159 | A1 | 4/2002 | Yamazaki et al. |
| 2003/0025118 | A1 | 2/2003 | Yamazaki et al. |
| 2005/0094083 | A1 | 5/2005 | Kwon et al. |
| 2009/0149007 | A1* | 6/2009 | Jung et al. ................. 438/487 |
| 2012/0217434 | A1* | 8/2012 | l'Abee ................. C09K 5/14 |
| | | | 252/74 |

FOREIGN PATENT DOCUMENTS

| | | | |
|---|---|---|---|
| CN | 102645785 | A | 8/2012 |
| JP | 862557 | A | 3/1996 |
| JP | 2002-303841 | | 10/2001 |
| JP | 2005-043677 | | 2/2005 |
| KR | 20070072140 | A | 7/2007 |
| WO | 2007/026907 | A1 | 3/2007 |

OTHER PUBLICATIONS

English translation of Chinese patent No. CN 1491984 (A), listed above in Foreign Patent Documents, 10 pages.
English translation of Japanese patent application publication No. JP 862557 (A), listed above in Foreign Patent Documents, 9 pages.
English abstract of Korean patent No. 20070072140 (A), listed above in Foreign Patent Documents, 1 page.
English translation of Korean patent No. 20070072140 (A), listed above in Foreign Patent Documents, 8 pages.
English translation of Chinese patent No. CN 102645785 (A), listed above in Foreign Patent Documents, 13 pages.
PCT International Search Report (Chinese language) issued by the International Searching Authority, Mar. 7, 2013, 13 pages.
First Examination Office Action (Chinese language) for priority application No. CN 201210044709.2 issued by the State Intellectual Property Office Mar. 6, 2014, 3 pages.
English translation of the First Examination Office Action (listed above), 1 page.
International Preliminary Report on Patentability for International Application No. PCT/CN2012/085202, 9pgs.

* cited by examiner

COLOR FILTER SUBSTRATE AND MANUFACTURING METHOD THEREOF

CROSS REFERENCE TO RELATED APPLICATIONS

This application is based on International Application No. PCT/CN2012/085202 filed on Nov. 23, 2012, which claims priority to Chinese National Application No. 201210044709.2 filed on Feb. 24, 2012, the contents of which are incorporated herein by reference.

TECHNICAL FIELD

Embodiments of the present application relate to a color filter substrate and the manufacturing method thereof.

BACKGROUND

With the technology development of thin film transistor liquid display (TFT-LCD), as well as the decreasing cost and the perfecting of the manufacturing process, it has become a main stream technique in the art of flat panel display. A TFT-LCD is formed by bonding a color filter substrate with an array substrate, wherein the color filter substrate is mainly used for providing colors for the TFT-LCD.

In the prior art, the manufacturing processes of the black matrix and the pixel resin layer are similar: firstly, a substrate is completely coated by a corresponding resin material comprising components such as a color pigment, a photoinitiator, a resin and a solvent, wherein the solvent used for mixing the other components is volatable at a high temperature. Such solvent needs to be removed after formation of a black matrix and a color pixel resin layer, so as to avoid deteriorating the adhesion of the black matrix and the color pixel resin layer to the glass substrate; secondly, the substrate coated with the resin material is pre-baked to solidify the resin material; then, an unnecessary resin material part is removed by processes of mask exposure and development, to form patterns of the black matrix and the pixel resin layer; finally, the patterns thus formed are further solidified by a post-baking, wherein the pixel resin layer comprises a red pixel resin layer, a green pixel resin layer and a blue pixel resin layer.

In practical manufacturing, insufficient removal of the solvent under an inadequate temperature in the pre-baking stage results in the drop-off of black matrix and pixel resin layer during the development process, thus affecting the productivity and quality of the color filter substrates. In the existing processes, the issue mentioned above is solved mainly by means of increasing the pre-baking temperature and prolonging the baking duration. Such means, however, largely increase energy consumption, thereby increasing the cost.

SUMMARY

An embodiment of the present application provides a color filter substrate comprising: a substrate; a black matrix and a color pixel layer formed on the substrate; and a transparent thermally conductive layer disposed between the substrate and the black matrix and between the substrate and the color pixel layer.

Another embodiment of the present application provides a manufacturing method of forming a color filter substrate, comprising: forming a transparent thermally conductive layer on a substrate; forming a black matrix pattern and a color pixel layer on the transparent thermally conductive layer by a patterning process.

BRIEF DESCRIPTION OF THE DRAWINGS

In order to clearly illustrate the technical solution of the embodiments of the invention, the drawings of the embodiments or the drawings required in describing the prior art will be briefly described in the following; it is obvious that the described drawings are only related to some embodiments of the invention and thus are not limitative of the invention.

DETAILED DESCRIPTION

One of the objects of the embodiments of the present application is to provide a color filter substrate and a manufacturing method thereof so as to avoid defects in the existing color filter substrate such as the drop-off of a black matrix and a color pixel layer during a development process caused by insufficient removal of the solvent in a resin material and thus a deteriorated quality.

The technical solutions of the embodiments of the present application will be described below in details in conjunction with the accompanied drawings. It is obvious they merely belong to a portion of the embodiments of the present application. All other embodiments that may be obtained by those skilled in the art based on the embodiments of the present application without creative works are within the protection scope of the present application.

Figure 6:
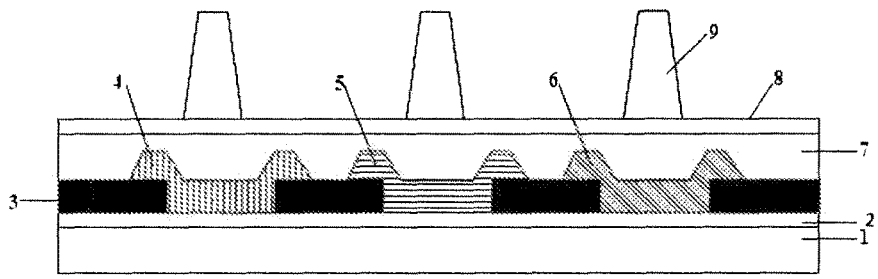
FIG. 6 is a schematic diagram showing the overall structure of a color filter substrate according to the embodiments of the present application.

As shown in FIG. 6, a color filter substrate according to an embodiments of the present application for example comprises: a glass substrate 1 with a transparent thermally conductive layer 2, a black matrix 3, a color pixel layer, a protection layer 7, a electrically conductive layer 8 and a spacer 9 successively formed thereon, wherein the color pixel layer comprises a red pixel layer 4, a green pixel layer 5 and a blue pixel layer 6.

In the color filter substrate, the transparent thermally conductive layer 2 has a thickness of 1 to 5 μm, thus enabling an optimal thermal conductivity of the transparent thermally conductive layer while keeping the color filter substrate light and thin. If the transparent thermally conductive layer is too thin, its thermal conductivity may be disadvantageously affect, thus leading to ineffective heat conduction of the transparent thermally conductive layer; if the transparent thermally conductive layer is too thick, the thickness of the color filter substrate will increase, thus resulting in a thicker LCD panel and a more bulky product, despite an improved thermal conductivity of the transparent thermally conductive layer. The black matrix has a thickness of 1 to 5 μm. The color pixel layer has a thickness of 1 to 5 μm. The protection layer has a thickness of 1 to 5 μm. The electrically conductive layer is an ITO film with a thickness of 500 to 2000 Å. The spacer has a shape of trapezoidal cylinder with a bottom section diameter of 15 to 20 μm and a top section diameter of 5 to 10 μm.

The transparent thermally conductive layer 2 is made of a thermally conductive material with a thermal conductivity of 2 to 4 w/mk. In an embodiment, the thermal conductivity of the thermally conductive layer can be set to 4 w/mk in order to adapt to the current equipment and processes, so that a good thermal conductivity is obtained. However, the thermal conductivity can be selected according to the actual equipment and processes. For example, the thermal conducive material of the transparent thermally conductive layer 2 can be made of a high molecular polymer doped with thermally conductive particles, wherein the thermally conductive particles can be one or more selected from the group consisting of a metal, a metal oxide and a non-metal. In an embodiment, the thermally conductive particles can be one or more selected from the group consisting of gold, silver, copper, aluminum, calcium, magnesium, iron, aluminum oxide, magnesium oxide, beryllium oxide, calcium oxide, nickel oxide, aluminum nitride, silicon nitride, silicon carbide, carbon fiber, diamond and quartz, and the high molecular polymer is composed of one or more selected from the group consisting of epoxy resin, silica gel, phenolic resin and polyimide. By providing the transparent thermally conductive layer 2, heat conduction within the color filter substrate may be improved. Heat is transferred to the black matrix and the color pixel layer to the largest extent during the process of baking, thus resulting in a fully volatilization of the solvent in the black matrix and the color pixel layer made of resins. The drop-off of the color pixel layer to be likely occurred in the following steps can be avoided due to the complete solvent removal. Accordingly, the efficiency and accuracy of the process are enhanced.

Figure 7:
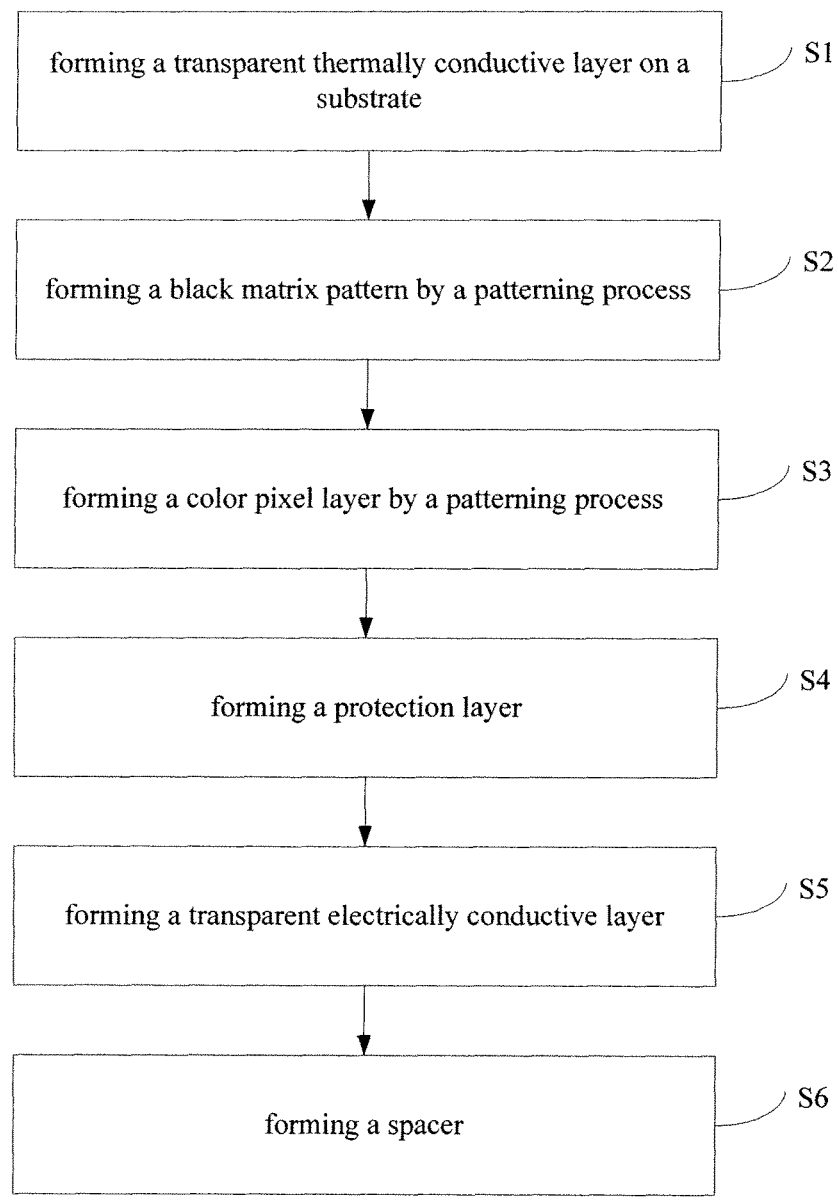
FIG. 7 is a flow chart showing the manufacturing method of a color filter substrate according to the embodiments of the present application.

As shown in FIG. 7, the method for manufacturing the color filter substrate according to the present application for example comprises:

Step 1, forming a transparent thermally conductive layer on a substrate.

Figure 1:
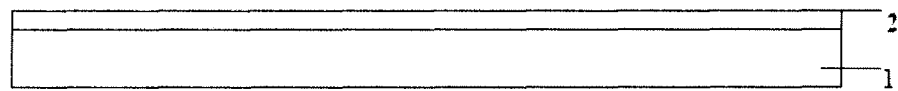
FIG. 1 is a structural schematic diagram showing a color filter substrate with a transparent thermally conductive layer formed thereon according to an embodiment of the present application.

Referring to FIG. 1, for example, a transparent thermally conductive material is coated onto the glass substrate 1 and formed into the transparent thermally conductive layer 2 by undergoing thermal baking and curing at a temperature of 80 to 100 □. Under such temperature, the thermally conductive layer can be quickly cured. If the temperature is too low, the curing of the thermally conductive layer will be adversely affected. If the temperature is too high, energy consumption will be increased, thus not cost-effective and environmentally friendly. Advantageously, a temperature of 90□ is optimized for the curing while ensuring energy-saving. The thermally conductive material is for example formed of a high molecular polymer doped with thermally conductive particles, wherein the thermally conductive particles can be one or more selected from the group consisting of a metal, a metal oxide and a non-metal, such as gold, silver, copper, aluminum, calcium, magnesium, iron, aluminum oxide, magnesium oxide, beryllium oxide, calcium oxide, nickel oxide, aluminum nitride, silicon nitride, silicon carbide, carbon fiber, diamond and quartz, and the high molecular polymer is epoxy resin, silica gel, phenolic resin or polyimide. For example, the transparent thermally conductive layer has a thickness of 1 to 5 μm.

By providing the transparent thermally conductive layer, heat can be transferred to a black matrix and a color pixel layer to the largest extent during pre-baking, so that the solvent in the black matrix and the color pixel layer made of resins volatilizes to the largest extent. Since the solvent is removed to the largest extent, the drop-off of the color pixel layer to be likely occurred in the following steps is avoided. Accordingly, the efficiency and accuracy of the process are enhanced.

Figure 2:
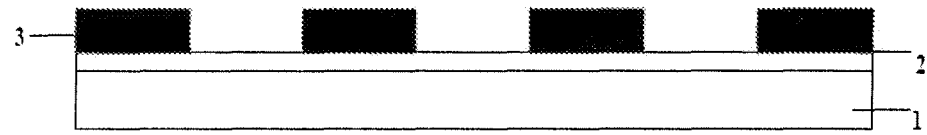
FIG. 2 is a structural schematic diagram showing a color filter substrate with a transparent thermally conductive layer and a black matrix formed thereon according to an embodiment of the present application.

Step 2, referring briefly to FIG. 2, a black matrix pattern 3 is formed on the glass substrate 1 after the step 1 by a patterning process. For example, a resin material for black matrix is coated onto the glass substrate after the step 1, and a black matrix pattern 3 is formed by an exposure process using a mask with a pattern etched thereon and a development process. The black matrix pattern thus formed has a thickness of 1 to 5 μm.

Figure 3:
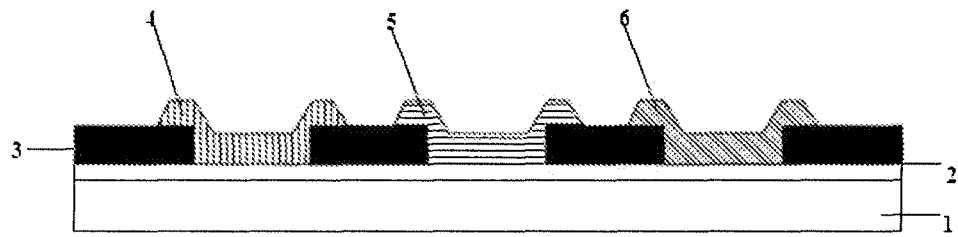
FIG. 3 is a structural schematic diagram showing a color filter substrate with a transparent thermally conductive layer, a black matrix and a color pixel layer formed thereon according to an embodiment of the present application.

Step 3, referring to FIG. 3, a color pixel layer is formed on the glass substrate 1 after the step 2 by patterning, wherein the color pixel layer comprises a red pixel layer 4, a green pixel layer 5 and a blue pixel layer 6. By way of example, a red pixel resin material is firstly coated onto the glass substrate after the step 2 and it is exposed through a mask with a pattern etched thereon and developed so as to obtain the red pixel layer 4. Then the green resin layer 5 and the blue resin layer 6 are individually formed by a similar process. The thicknesses of the green pixel layer 4, the green pixel layer 5 and the blue pixel layer 6 for example are 1 to 5 μm. In an embodiment, the color pixel layer is a color pixel resin layer.

Figure 4:
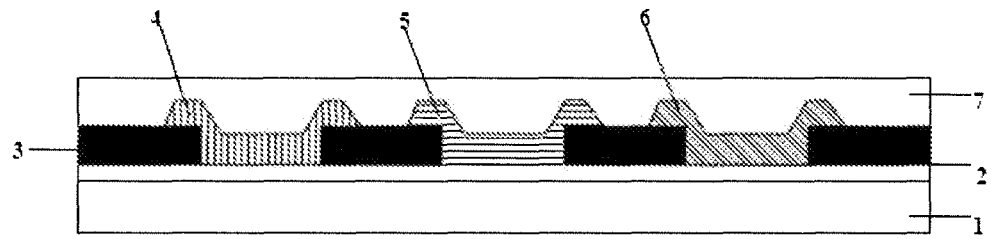
FIG. 4 is a structural schematic diagram showing a color filter substrate with a transparent thermally conductive layer, a black matrix, a color pixel layer and a protection layer formed thereon according to an embodiment of the present application.

Step 4, referring to FIG. 4, a protection layer 7 is formed on the glass substrate after the step 3. By way of example, a photoresist for the protection layer is coated onto the glass substrate 1 after the step 3 and thermally cured so as to form the transparent protection layer 7. The thickness of the protection layer 7 for example is 1 to 5 μm.

Figure 5:
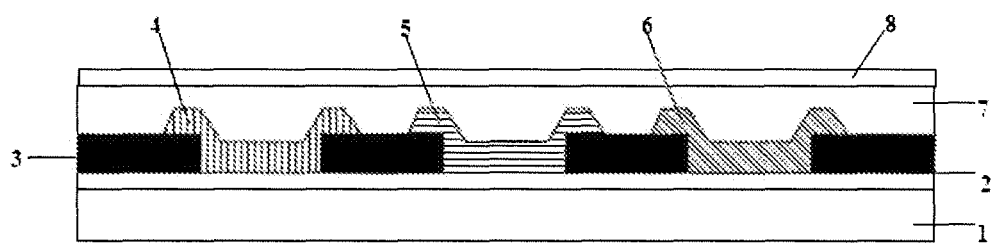
FIG. 5 is a structural schematic diagram showing a color filter substrate with a transparent thermally conductive layer, a black matrix, a color pixel layer and a protection layer formed thereon according to an embodiment of the present application.

Step 5, referring to FIG. 5, a transparent electrically conductive layer 8 is formed on the glass substrate 1 after the step 4. By way of example, a transparent electrically conductive layer 8 for example having a thickness of 500 to 2000 Å is formed onto the glass substrate 1 after the step 4 by plating.

Step 6, referring to FIG. 6, a spacer 9 is formed on the glass substrate after the step 5. By way of example, a photoresist for the spacer is coated onto the glass substrate 1 after the step 5, and the spacer 9 is formed by exposure and development process. The spacer has a shape of trapezoidal cylinder with a bottom section diameter of 15 to 20 μm and a top section diameter of 5 to 10 μm.

In the color filter substrate and the manufacturing method thereof according to the embodiments of the present application, the heat conduction within the color filter substrate can be improved by providing the transparent thermally conductive layer on the substrate. Heat can be transferred to the black matrix and the color pixel layer disposed on the transparent thermally conductive layer to the largest extent during the baking, so that the solvent in the resin material is sufficiently removed during the pre-baking. Therefore, the drop-off of the color pixel layer to be likely occurred in the following steps is avoided. Accordingly, the quality of the color filter substrate is ensured.

According to the above description, the embodiments of the present application can at least provide the structures and methods as follows:

(1) A color filter substrate comprising: a substrate; a black matrix and a color pixel layer formed on the substrate; and a transparent thermally conductive layer disposed between the substrate and the black matrix and between the substrate and the color pixel layer.

(2) The color filter substrate according to (1), further comprising a protection layer, an electrically conductive layer and a spacer successively formed on the black matrix and color pixel layer.

(3) The color filter substrate according to (1), wherein the transparent thermally conductive layer is made of a thermally conductive material having a thermal conductivity of 2-4 w/mk.

(4) The color filter substrate according to (3), wherein the thermally conductive material of the transparent thermally conductive layer is formed by a high molecular polymer containing thermally conductive particles.

(5) The color filter substrate according to (4), wherein the high molecular polymer is constituted by one or more selected from a group consisting of epoxy resin, silica gel, phenolic resin and polyimide.

(6) The color filter substrate according to (4), wherein the thermally conductive particles is one or more selected from a group consisting of gold, silver, copper, aluminum, calcium, magnesium, iron, aluminum oxide, magnesium oxide, beryllium oxide, calcium oxide, nickel oxide, aluminum nitride, silicon nitride, silicon carbide, carbon fiber, diamond and quartz.

(7) The color filter substrate according to (1) to (6), wherein the transparent thermally conductive layer has a thickness ranging from 1 to 5 μm.

(8) The color filter substrate according to any of claims 1) to (7), wherein the color pixel layer is a color pixel resin layer.

(9) A manufacturing method of a color filter substrate comprising:
forming a transparent thermally conductive layer on a substrate:
forming a black matrix pattern and a color pixel layer on the transparent thermally conductive layer by a patterning process.

(10) The manufacturing method of the color filter substrate according to (9), further comprising successively forming a protection layer, an electrically conductive layer and a spacer on the black matrix pattern and the color pixel layer.

(11) The manufacturing method of the color filter substrate according to (9), wherein the forming of the transparent thermally conductive layer is performed by coating a transparent thermally conductive material on the substrate and baking and curing it at a temperature of 80-100° C.

Despite the present application is described in details with general description and embodiments, those skilled in the art may still contemplate there might be modifications or improvements to the embodiments benefiting from the teaching above. Thus, the modifications or improvements with the spirit of the present application still falls into the scope of the present application as set in the claims.

The invention claimed is:
1. A manufacturing method of a color filter substrate comprising:
   Step 1, forming a transparent thermally conductive layer on a substrate by coating a transparent thermally conductive material on the substrate and baking and curing it at a temperature of 80-100° C.;
   Step 2, forming a black matrix pattern on the transparent thermally conductive layer;
   Step 3, forming a color pixel resin layer on the transparent thermally conductive layer,
   wherein a thermally conductive material of the transparent thermally conductive layer is formed by a high molecular polymer containing thermally conductive particles, the high molecular polymer is constituted by one or more selected from a group consisting of silica gel, phenolic resin and polyimide, the transparent thermally conductive layer has a thickness ranging from 1 to 5 μm.

2. The manufacturing method of the color filter substrate according to claim 1, further comprising successively forming a protection layer, an electrically conductive layer and a spacer on the substrate after the step 3.

* * * * *